(12) United States Patent
Yamamoto

(10) Patent No.: US 10,564,347 B2
(45) Date of Patent: Feb. 18, 2020

(54) OPTICAL FIBER AND LIGHT SOURCE DEVICE

(71) Applicant: SUMITOMO ELECTRIC INDUSTRIES, LTD., Osaka-shi, Osaka (JP)

(72) Inventor: Yoshinori Yamamoto, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/194,574

(22) Filed: Nov. 19, 2018

(65) Prior Publication Data

US 2019/0162895 A1 May 30, 2019

(30) Foreign Application Priority Data

Nov. 24, 2017 (JP) .................. 2017-225686

(51) Int. Cl.
| | | |
|---|---|---|
| *G02B 6/02* | (2006.01) | |
| *G02B 6/028* | (2006.01) | |
| *G02B 6/036* | (2006.01) | |
| *G02F 1/35* | (2006.01) | |
| *G02F 1/365* | (2006.01) | |

(52) U.S. Cl.
CPC ....... *G02B 6/02038* (2013.01); *G02B 6/0208* (2013.01); *G02B 6/02028* (2013.01); *G02B 6/0281* (2013.01); *G02B 6/02257* (2013.01); *G02B 6/03627* (2013.01); *G02F 1/365* (2013.01); *G02F 2001/3528* (2013.01)

(58) Field of Classification Search
None
See application file for complete search history.

(56) References Cited

U.S. PATENT DOCUMENTS

| | | |
|---|---|---|
| 7,233,727 B2 | 6/2007 | Hirano et al. |
| 2002/0041746 A1* | 4/2002 | Kato .................. G02B 6/02004 385/123 |
| 2007/0047962 A1 | 3/2007 | Hirano et al. |

FOREIGN PATENT DOCUMENTS

JP 2005-331818 A 12/2005

OTHER PUBLICATIONS

Hirano, Masaaki, et al., "Silica-based Highly Nonlinear Fiber Advances," OFC2016, Tu2E.4 (2016), 3 pages.

\* cited by examiner

*Primary Examiner* — Chad H Smith
(74) *Attorney, Agent, or Firm* — Drinker Biddle & Reath LLP

(57) ABSTRACT

An optical fiber made of silica glass includes a core having a maximum refractive index n1, a depressed portion surrounding the core and having an average refractive index n2, and cladding surrounding the depressed portion and having an average refractive index n3. In the optical fiber, n1>n3>n2. The optical fiber has a local maximum value of chromatic dispersion within a wavelength range of 1530 nm to 1610 nm, and the local maximum value is −2 ps/nm/km or greater and below 0 ps/nm/km.

11 Claims, 15 Drawing Sheets

FIG. 13

| | Δ1 | Δ2 | 2b/2a | CORE DIAMETER 2a | CORE AREA A | CORE-AREA RATIO ρ | DISPERSION at 1550nm | DISPERSION SLOPE at 1550nm |
|---|---|---|---|---|---|---|---|---|
| | [%] | [%] | | [μm] | [%·μm] | | [ps/nm/km] | [ps/nm²/km] |
| FIBER 1 | 1.24 | -0.79 | 2.2 | 4.64 | 2.29 | 0.77 | -0.34 | -0.0032 |
| FIBER 2 | 1.31 | -0.96 | 3.0 | 3.93 | 2.30 | 0.86 | -0.95 | 0.0003 |
| FIBER 3 | 1.41 | -0.81 | 1.7 | 4.61 | 2.74 | 0.85 | -0.21 | -0.0017 |
| FIBER 4 | 1.44 | -0.50 | 2.0 | 4.54 | 2.39 | 0.72 | -2.17 | 0.0084 |
| FIBER 5 | 1.46 | -0.65 | 2.1 | 4.82 | 2.47 | 0.71 | -0.98 | 0.0106 |
| FIBER 6 | 1.49 | -0.79 | 2.0 | 4.35 | 2.78 | 0.83 | -0.47 | 0.0010 |
| FIBER 7 | 1.55 | -0.70 | 2.1 | 4.37 | 2.68 | 0.80 | -1.07 | 0.0026 |
| FIBER 8 | 1.76 | -0.71 | 1.8 | 4.28 | 3.12 | 0.83 | -1.12 | 0.0043 |
| FIBER 9 | 2.12 | -0.74 | 2.5 | 3.52 | 3.56 | 0.95 | -1.97 | 0.0054 |
| FIBER 10 | 2.42 | -0.74 | 2.1 | 3.62 | 4.00 | 0.89 | -1.36 | 0.0067 |
| FIBER 11 | 2.98 | -0.84 | 1.9 | 3.32 | 4.70 | 0.95 | -1.76 | -0.0026 |
| FIBER 12 | 3.00 | -0.77 | 2.0 | 3.42 | 4.73 | 0.90 | -1.15 | 0.0058 |

FIG. 14

| | PEAK WAVELENGTH | PEAK DISPERSION | DISPERSION CURVE at PEAK WAVELENGTH | MFD at 1550nm | Aeff at 1550nm | γ at 1550nm | k VALUE at 1550nm |
|---|---|---|---|---|---|---|---|
| | [μm] | [ps/nm/km] | [ps/nm³/km] | [μm] | [μm²] | [1/W/km] | |
| FIBER 1 | 1.539 | -0.33 | -0.00028 | 4.66 | 16.7 | 10.0 | 0.98 |
| FIBER 2 | 1.552 | -0.95 | -0.00030 | 4.27 | 14.1 | 12.8 | 0.99 |
| FIBER 3 | 1.541 | -0.20 | -0.00017 | 4.64 | 16.8 | 10.4 | 0.99 |
| FIBER 4 | 1.609 | -1.93 | -0.00014 | 4.72 | 17.0 | 10.0 | 0.97 |
| FIBER 5 | 1.601 | -0.70 | -0.00022 | 4.60 | 16.1 | 10.4 | 0.97 |
| FIBER 6 | 1.556 | -0.47 | -0.00019 | 4.41 | 15.1 | 11.8 | 0.99 |
| FIBER 7 | 1.564 | -1.05 | -0.00019 | 4.41 | 15.0 | 11.8 | 0.98 |
| FIBER 8 | 1.582 | -1.06 | -0.00013 | 4.28 | 14.2 | 13.1 | 0.99 |
| FIBER 9 | 1.592 | -1.86 | -0.00012 | 3.76 | 11.1 | 19.0 | 1.00 |
| FIBER 10 | 1.606 | -1.18 | -0.00011 | 3.67 | 10.6 | 20.9 | 1.00 |
| FIBER 11 | 1.532 | -1.74 | -0.00014 | 3.35 | 8.9 | 28.1 | 1.01 |
| FIBER 12 | 1.599 | -1.01 | -0.00011 | 3.38 | 9.0 | 27.4 | 1.00 |

OPTICAL FIBER AND LIGHT SOURCE DEVICE

BACKGROUND OF THE INVENTION

Field of the Invention

The present invention relates to an optical fiber and a light source device including an optical fiber.

Description of the Related Art

High-power signal light propagated in an optical fiber causes a nonlinear optical phenomenon such as four-wave mixing (FWM), self-phase modulation (SPM), or cross-phase modulation (XPM). In optical fiber communications, such a nonlinear optical phenomenon deteriorates the quality of signal light and limits the capacity of information propagatable. Therefore, optical fibers for communications are desired not to cause the nonlinear optical phenomenon.

Meanwhile, there has been a proposal of an applied technology in which the nonlinear optical phenomenon that occurs in an optical fiber is utilized positively. Specifically, a silica-glass-based highly nonlinear optical fiber (HNLF) has been in development as an optical fiber suitable for efficiently causing the nonlinear optical phenomenon. The HNLF is employed in various applied technologies such as fiber lasers; wideband low-noise optical amplification; supercontinuum (SC) light sources; optical signal processing; distortion and temperature sensors; measurement of frequency, time, length, and so forth; and near-infrared spectroscopy.

A nonlinear coefficient γ[1/W/km] representing the degree of nonlinearity of an optical fiber is defined as follows:

$$\gamma = n2/Aeff \times 2\pi/\lambda, \quad (1)$$

where n2 denotes the nonlinear refractive index [m²/W] of glass, Aeff denotes the effective area [μm²] of the optical fiber, and λ denotes the wavelength [nm].

One of the applied technologies employing the HNLF is an optical frequency comb, which is generated as follows. Seed light having a single or a few wavelengths is inputted to the HNLF, whereby FWM occurs in the HNLF. Consequently, multiwavelength light having wavelengths at regular intervals is outputted from the HNLF. The optical frequency comb has long been studied for some uses such as measurement and spectroscopy. In recent years, application of the optical frequency comb to a multiwavelength light source for large-capacity wavelength-division-multiplexing (WDM) transmission has been being examined.

There is a proposal of a dispersion-flattened HNLF, which causes FWM with high efficiency and generates a high-quality optical frequency comb over a wide wavelength range around 1550 nm, which is a waveband used for optical communications. In the dispersion-flattened HNLF, the absolute value of chromatic dispersion is small and the dispersion slope is substantially zero (the chromatic dispersion becomes maximal) around the wavelength of 1550 nm. That is, the absolute value of chromatic dispersion is suppressed to be small over a wide waveband. In this specification, a wavelength at which the dispersion slope becomes zero and the chromatic dispersion becomes maximal is referred to as "peak wavelength" [nm], and the chromatic dispersion at the peak wavelength is referred to as "peak dispersion" [ps/nm/km].

Masaaki Hirano et al. discuss, in "Silica-based Highly Nonlinear Fiber Advances," OFC2016, Tu2E.4 (2016), an HNLF having a peak wavelength in the waveband for optical communications with a peak dispersion of zero (see HNLF-F in Table 1, and Type-III in FIG. 2).

In JP2005-331818A, a dispersion-flattened HNLF having a peak wavelength of 1550 nm with a peak dispersion of zero is disclosed in FIGS. 2 and 7 and Tables 1 and 2, and another HNLF in which the chromatic dispersion at 1550 nm is substantially zero but the peak wavelength is longer than or shorter than 1550 nm is disclosed in FIG. 11 and Table 3. These HNLFs each exhibit an anomalous peak dispersion (a positive chromatic dispersion).

SUMMARY OF THE INVENTION

It is an object of the present invention to provide a dispersion-flattened highly nonlinear optical fiber capable of efficiently generating a wideband optical frequency comb over either the C band or the L band, or both the C band and the L band.

According to an aspect of the present invention, there is provided an optical fiber made of silica glass. The optical fiber includes a core having a maximum refractive index n1, a depressed portion surrounding the core and having an average refractive index n2, and cladding surrounding the depressed portion and having an average refractive index n3. In the optical fiber, n1>n3>n2. The optical fiber has a local maximum value of chromatic dispersion within a wavelength range of 1530 nm to 1610 nm, and the local maximum value is −2 ps/nm/km or greater and below 0 ps/nm/km.

In the optical fiber according to the above aspect of the present invention, an effective area at a wavelength of 1550 nm may be 18 μm² or smaller. Furthermore, a nonlinear coefficient at the wavelength of 1550 nm may be 9/W/km or larger. Furthermore, a dispersion curve at the wavelength at which chromatic dispersion becomes maximal within the wavelength range of 1530 nm to 1610 nm is −0.0003 ps/nm³/km or greater and 0 ps/nm³/km or smaller. Furthermore, a k value at the wavelength of 1550 nm may be 1.01 or smaller.

In the optical fiber according to the above aspect of the present invention, a core area A [%·μm] may be 2.2%·μm or greater. The core area A is defined as follows:

$$A = \int_0^a \Delta(r)dr, \quad (2)$$

where a denotes a radius [μm] of the core, and Δ(r) denotes a relative refractive-index difference [%] at a radial distance r [μm] from a fiber axis. Furthermore, a maximum relative refractive-index difference Δ1 of the core with respect to the cladding may be 1.2% or higher and 3.0% or lower, and a core-area ratio ρ may be 0.7 or greater and 1.0 or smaller. The core-area ratio ρ is defined as follows:

$$\rho = A/(\Delta 1 \times a). \quad (3)$$

In the optical fiber according to the above aspect of the present invention, a diameter 2a of the core may be 3.0 μm or longer and 5.0 μm or shorter. Furthermore, a ratio 2b/2a of an outside diameter 2b of the depressed portion to the diameter 2a of the core may be 1.6 or greater and 3.2 or smaller, and an average relative refractive-index difference Δ2 of the depressed portion with respect to the cladding may be −1.0% or higher and −0.5% or lower.

According to another aspect of the present invention, there is provided a light source device including a seed light source that emits light having four or less wavelength components with a center wavelength being within a range of 1530 nm to 1610 nm, and the optical fiber according to the above aspect of the present invention that receives, at an input end, the light emitted from the seed light source and allows the light to be guided inside the optical fiber. Light having more wavelength components than the light outputted from the seed light source is generated with a nonlinear optical phenomenon that occurs in the optical fiber while the light is being guided in the optical fiber, and the generated light is outputted from an output end of the optical fiber.

According to each of the above aspects of the present invention, a dispersion-flattened highly nonlinear optical fiber can be provided that is capable of efficiently generating a wideband optical frequency comb over either the C band or the L band or both the C band and the L band, without causing modulation instability and with a relatively low splicing loss in the connection to an SSMF.

BRIEF DESCRIPTION OF THE DRAWINGS

FIG. 10 is a graph illustrating a k value of the optical fiber illustrated in FIG. 1 at the wavelength of 1550 nm for each of different values of Δ1 and a core diameter 2a.

FIG. 12 is a graph illustrating the peak wavelength of the optical fiber illustrated in FIG. 1 for each of different values of Δ1 and a ratio 2b/2a.

FIG. 13 is a table that summarizes relevant specifications of dispersion-flattened HNLFs according to different examples.

FIG. 14 is a table that summarizes other relevant specifications of the dispersion-flattened HNLFs according to the examples.

DESCRIPTION OF THE PREFERRED EMBODIMENTS

Figure 1:
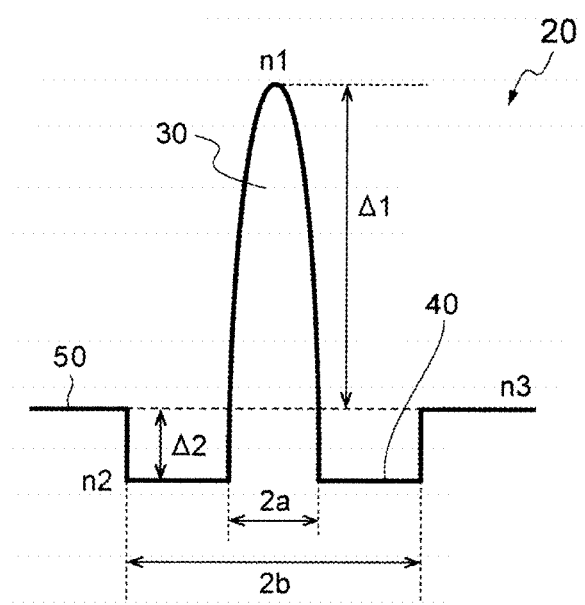
FIG. 1 is a conceptual diagram illustrating a refractive-index distribution of an optical fiber according to an embodiment of the present invention.

Embodiments of the present invention will now be described in detail with reference to the accompanying drawings, wherein like elements are denoted by identical reference numerals, and redundant description of such elements is omitted. The present invention is not limited to the following embodiments. It is intended that the scope of the present invention be defined by the appended claims and encompasses all equivalents to the claims and all changes made to the claims within the scope thereof.

In a dispersion-flattened HNLF, as the wavelength deviates from the peak wavelength toward the shorter wavelength side or the longer wavelength side, the value of chromatic dispersion deviates from the peak dispersion. Therefore, to generate a wideband optical frequency comb over either the C band (1530 nm to 1565 nm) or the L band (1565 nm to 1610 nm) or both the C band and the L band with a small absolute value of chromatic dispersion, the peak wavelength needs to be within the C band or the L band, rather than the chromatic dispersion at the wavelength of 1550 nm being 0 ps/nm/km.

In the range of anomalous dispersion, a nonlinear optical phenomenon called modulation instability occurs, which causes distortion in the waveform transmitted. Therefore, it is desired that the dispersion be normal (the chromatic dispersion be negative) over the entirety of the wavelength range to be used. That is, the peak dispersion needs to be below zero.

Furthermore, in the dispersion-flattened HNLF, a smaller Aeff and a greater nonlinear coefficient γ are preferable because FWM can be made to occur with higher efficiency. JP2005-331818A also refers to the benefit of a smaller Aeff that makes the nonlinear coefficient greater. If such a dispersion-flattened HNLF is employed as an element of a light source device, one end or both ends of the HNLF are connected to a standard single-mode fiber (SSMF). At the wavelength of 1550 nm, the SSMF has an Aeff of about 80 $\mu m^2$ and a mode-field diameter (MFD) of about 10.4 μm.

In general, the MFD of the dispersion-flattened HNLF is smaller than the MFD of the SSMF. It is known that a large difference in MFD between fibers that are connected to each other results in a large splicing loss. A large splicing loss substantially results in low optical power to be inputted to the dispersion-flattened HNLF. Therefore, the splicing loss in the connection to the SSMF needs to be small. Accordingly, to reduce the difference in MFD between the dispersion-flatted HNLF and the SSMF and thus reduce the splicing loss, the MFD of the dispersion-flatted HNLF is desired to be large. To increase the MFD without changing Aeff, a k value defined in the following expression, $$Aeff = k \times \pi \times (MFD/2)^2, \quad (4)$$

needs to be small. However, consideration for increasing the MFD is not given by either Masaaki Hirano et al, "Silica-based Highly Nonlinear Fiber Advances," OFC2016, Tu2E.4 (2016) or JP2005-331818A.

FIG. 1 is a conceptual diagram illustrating a refractive-index distribution of an optical fiber 20 according to an embodiment of the present invention. The optical fiber 20 is made of silica glass and includes a core 30 having a maximum refractive index n1, a depressed portion 40 surrounding the core 30 and having an average refractive index n2, and cladding 50 surrounding the depressed portion 40 and having an average refractive index n3. The relationship among the refractive indices is expressed as n1>n3>n2. The core 30 has a diameter 2a. The depressed portion 40 has an outside diameter 2b. The maximum relative refractive-index difference of the core 30 with respect to the cladding 50 is denoted as Δ1 (=100×(n1−n3)/n1) [%]. The average relative refractive-index difference of the depressed portion 40 with respect to the cladding 50 is denoted as Δ2 (=100×(n2−n3)/n2) [%]. The core 30 is made of silica glass containing GeO$_2$. The depressed portion 40 is made of silica glass containing F. The cladding 50 may be made of either pure silica glass or silica glass containing F or Cl.

Figure 2:
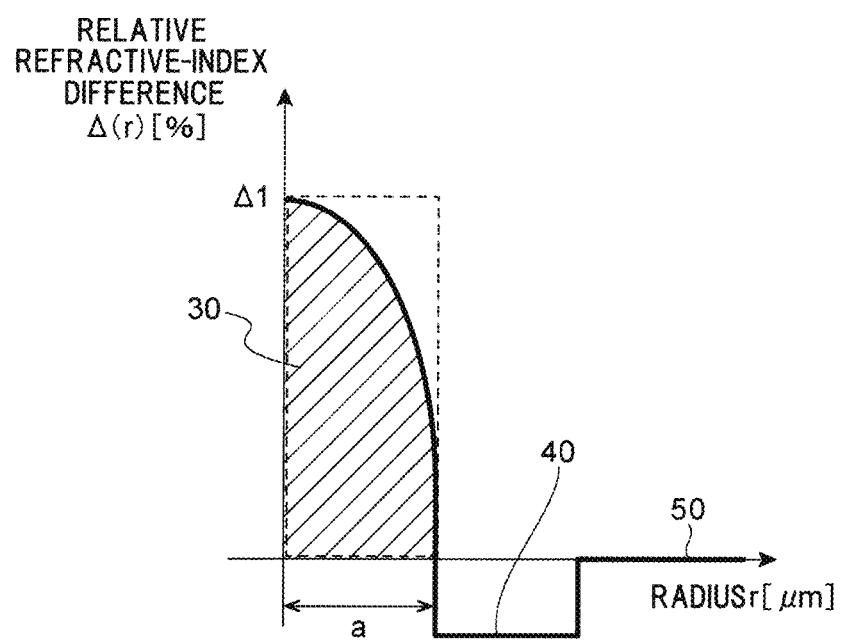
FIG. 2 is a conceptual diagram illustrating a relative refractive-index difference Δ(r) [%] of the optical fiber illustrated in FIG. 1 with respect to a radial distance r [μm] from a fiber axis.

FIG. 2 is a conceptual diagram illustrating a relative refractive-index difference Δ(r) [%] of the optical fiber 20 with respect to a radial distance r [μm] from the fiber axis. The area of the hatched part is defined as core area [%·μm] and is defined as follows:

$$A = \int_0^a \Delta(r)dr. \quad (5)$$

Furthermore, a core-area ratio ρ is defined as follows:

$$\rho = A/(\Delta 1 \times a), \quad (6)$$

where a denotes the radius of the core 30 and corresponds to a distance from the fiber axis to a position where the refractive index becomes equal to the refractive index n3 of the cladding 50, or a distance from the fiber axis to a position where the differential value obtained by differentiating the refractive-index distribution of the core 30 with a variable r becomes maximum.

FIGS. 3 to 10 described below each illustrate a property of the optical fiber 20 having Δ2=−0.79% and 2b/2a=2.0. Furthermore, the core radius a of the optical fiber 20 is adjusted such that the peak dispersion becomes −0.5 ps/nm/km.

Figure 3:
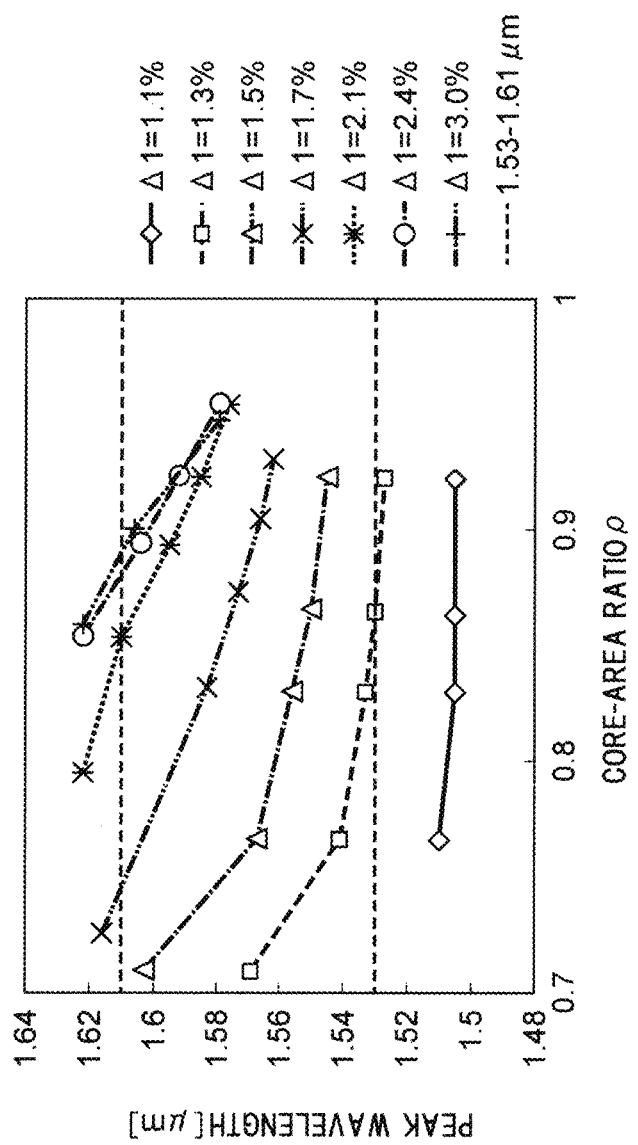
FIG. 3 is a graph illustrating a peak wavelength of the optical fiber illustrated in FIG. 1 for each of different values of Δ1 and a core-area ratio ρ.

FIG. 3 is a graph illustrating the peak wavelength for each of different values of Δ1 and the core-area ratio ρ. As Δ1 becomes higher, the peak wavelength becomes longer. However, if ρ is increased, the peak wavelength can be shifted toward the shorter wavelength side. To set the peak wavelength to a value within a range of 1530 nm to 1610 nm, it is preferable that Δ1 be within a range of 1.2% to 3.0% and ρ be within a range of 0.7 to 1.0.

Figure 4:
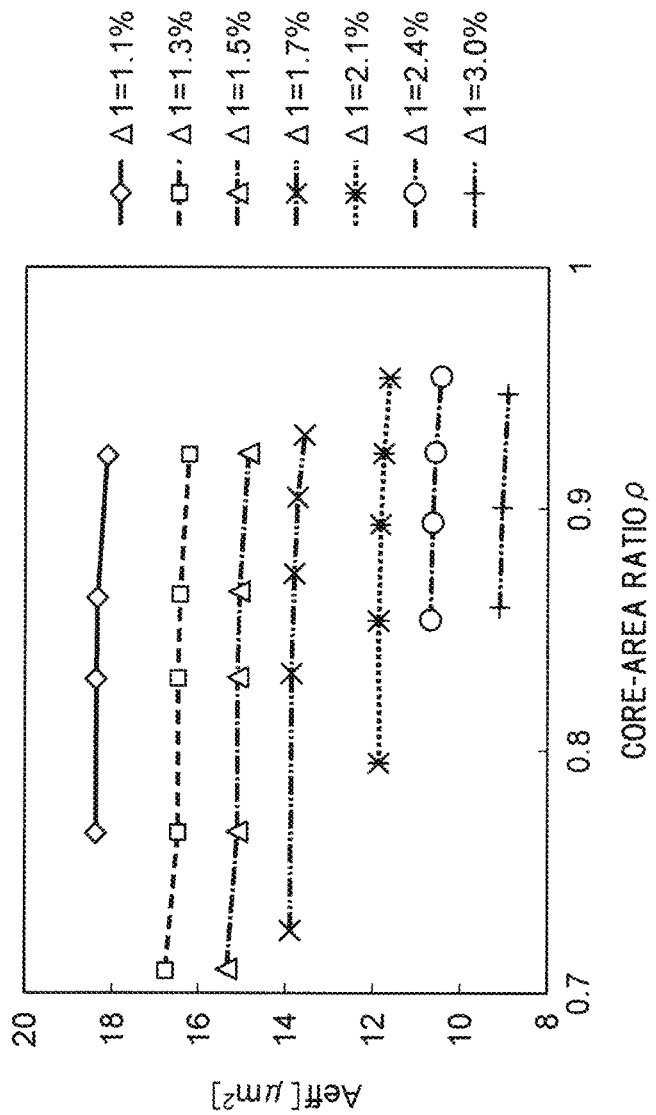
FIG. 4 is a graph illustrating an effective area Aeff of the optical fiber illustrated in FIG. 1 at a wavelength of 1550 nm for each of different values of Δ1 and the core-area ratio ρ.
Figure 5:
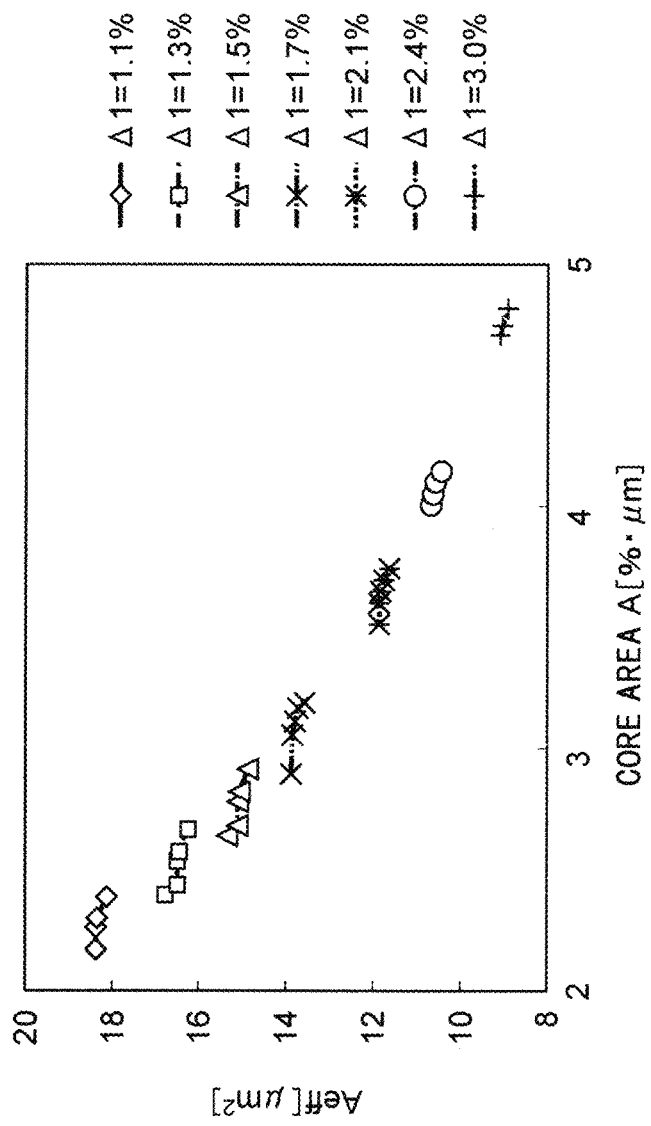
FIG. 5 is a graph illustrating the effective area Aeff of the optical fiber illustrated in FIG. 1 at the wavelength of 1550 nm for each of different values of Δ1 and a core area A.

FIG. 4 is a graph illustrating the effective area Aeff at the wavelength of 1550 nm for each of different values of Δ1 and the core-area ratio ρ. FIG. 5 is a graph illustrating the effective area Aeff at the wavelength of 1550 nm for each of different values of Δ1 and the core area A. As Δ1 becomes higher, Aeff becomes smaller. As illustrated in FIG. 4, if Δ1 is fixed, a greater ρ is preferable because Aeff becomes smaller. Consequently, the density of optical power is increased, whereby the nonlinear optical phenomenon can be produced efficiently. Furthermore, as illustrated in FIG. 5, a greater core area A is preferable because Aeff can be made smaller. To set Aeff to 18 μm$^2$ or smaller, it is preferable that Δ1 be 1.2% or higher, ρ be 0.7 to 1.0, and A be 2.2%·μm or greater. It is more preferable to set Aeff to 15 μm$^2$ or smaller, with Δ1 being 1.4% or higher and A be 2.6%·μm or greater. It is most preferable to set Aeff to 12 μm$^2$ or smaller, with Δ1 being 2.0% or higher and A being 3.3%·μm or greater.

Figure 6:
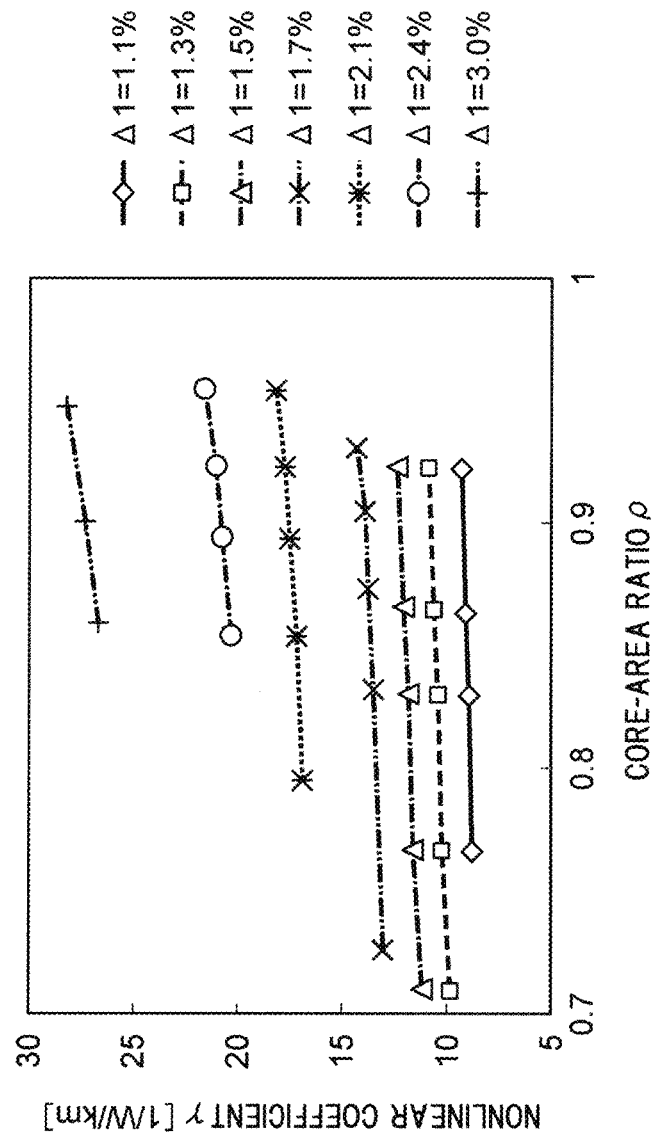
FIG. 6 is a graph illustrating a nonlinear coefficient γ of the optical fiber illustrated in FIG. 1 at the wavelength of 1550 nm for each of different values of Δ1 and the core-area ratio ρ.
Figure 7:
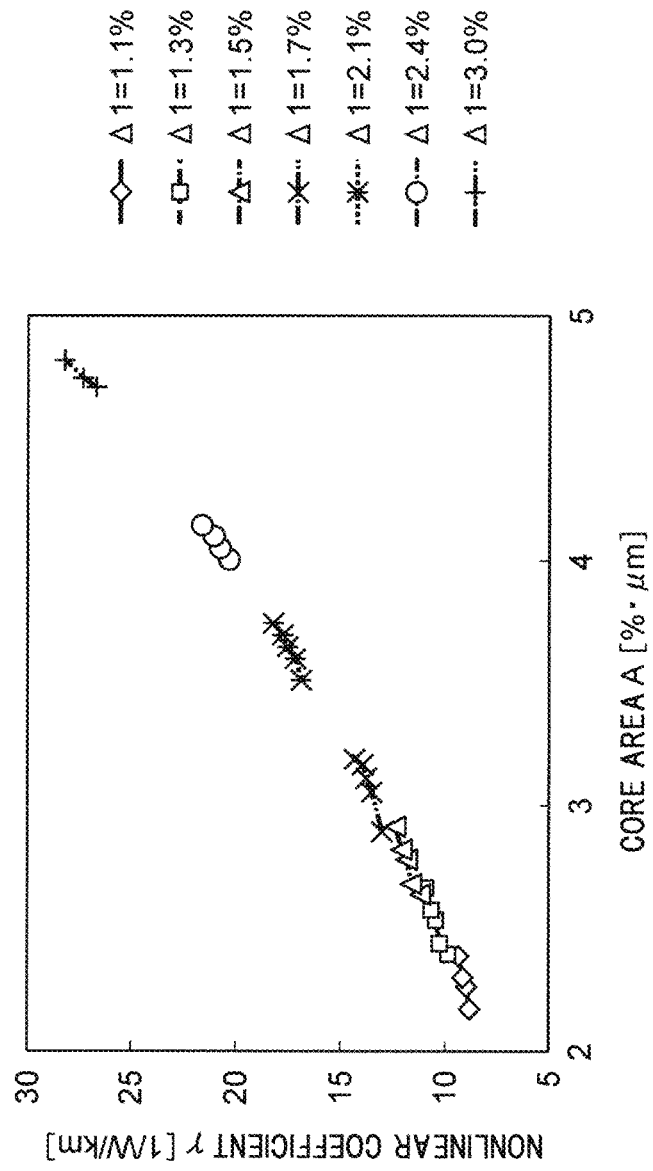
FIG. 7 is a graph illustrating the nonlinear coefficient γ of the optical fiber illustrated in FIG. 1 at the wavelength of 1550 nm for each of different values of Δ1 and the core area A.

FIG. 6 is a graph illustrating the nonlinear coefficient γ at the wavelength of 1550 nm for each of different values of Δ1 and the core-area ratio ρ. FIG. 7 is a graph illustrating the nonlinear coefficient γ at the wavelength of 1550 nm for each of different values of Δ1 and the core area A. As Δ1 becomes higher, γ becomes greater. As illustrated in FIG. 6, if Δ1 is fixed, a greater ρ is preferable because γ becomes greater, whereby the nonlinear optical phenomenon can be produced efficiently. Furthermore, as illustrated in FIG. 7, a greater core area A is preferable because γ can be made greater. To set γ to 9/W/km or greater, it is preferable that Δ1 be 1.2% or higher, ρ be 0.7 to 1.0, and A be 2.2%·μm or greater. It is more preferable to set γ to 11/W/km or greater, with Δ1 being 1.4% or higher and A being 2.6%·μm or greater. It is most preferable to set γ to 15/W/km or greater, with Δ1 being 2.0% or higher and A being 3.3%·μm or greater.

Figure 8:
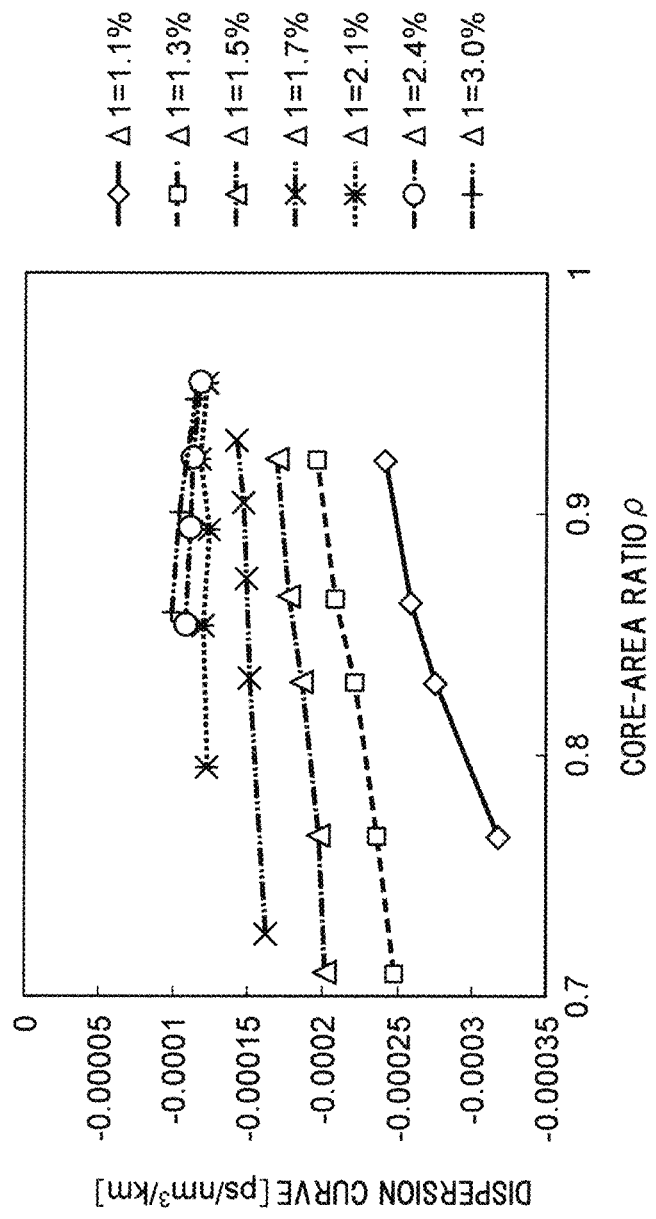
FIG. 8 is a graph illustrating a dispersion curve of the optical fiber illustrated in FIG. 1 at a peak wavelength for each of different values of Δ1 and the core-area ratio ρ.
Figure 9:
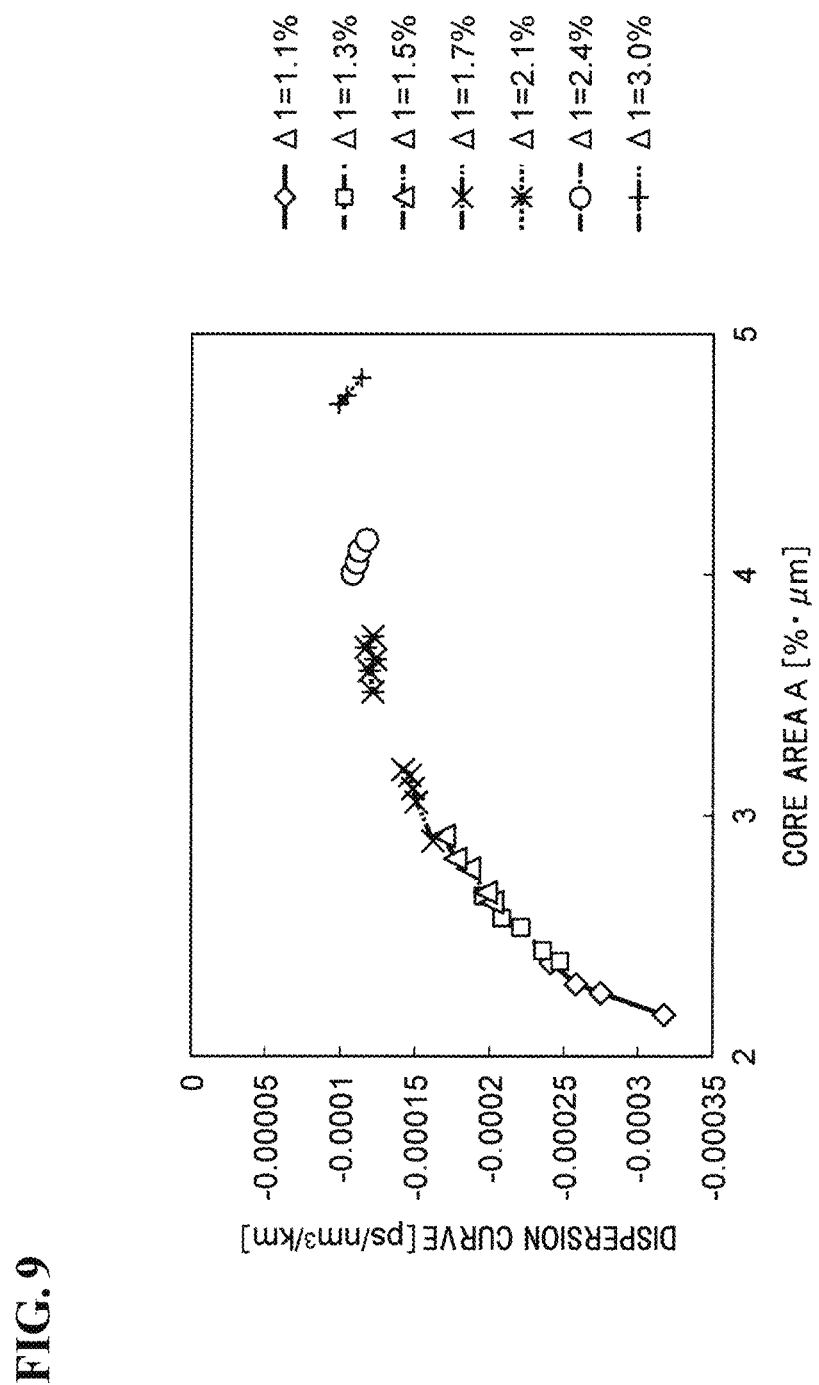
FIG. 9 is a graph illustrating the dispersion curve of the optical fiber illustrated in FIG. 1 at the peak wavelength for each of different values of Δ1 and the core area A.

FIG. 8 is a graph illustrating the dispersion curve at the peak wavelength for each of different values of Δ1 and the core-area ratio ρ. FIG. 9 is a graph illustrating the dispersion curve at the peak wavelength for each of different values of Δ1 and the core area A. Herein, the dispersion curve [ps/nm$^3$/km] refers to a value obtained by differentiating the dispersion slope [ps/nm$^2$/km] with wavelength. As the absolute value of dispersion curve at the peak wavelength becomes smaller, the dispersion becomes flatter with respect to the wavelength. Therefore, to reduce the absolute value of dispersion over a wide waveband and thus generate a wideband optical frequency comb, the dispersion curve is preferably close to zero.

As illustrated in FIG. 8, a higher Δ1 is preferable because the absolute value of dispersion curve can be made smaller. Furthermore, at a Δ1 of 2.1% or lower, if Δ1 is fixed, a greater ρ is preferable because the absolute value of dispersion curve can be made smaller. Furthermore, as illustrated in FIG. 9, a greater A is preferable because the absolute value of dispersion curve can be made smaller. To set the dispersion curve at the peak wavelength to a value within a range of −0.0003 to 0 ps/nm$^3$/km, it is preferable that Δ1 be 1.1% or higher, ρ be 0.7 to 1.0, and the core area A be 2.2%·μm or greater. It is more preferable to set the dispersion curve at the peak wavelength to a value within a range of −0.0002 to 0 ps/nm$^3$/km, with Δ1 being 1.3% or higher and the core area A being 2.6%·μm or greater.

Figure 10:
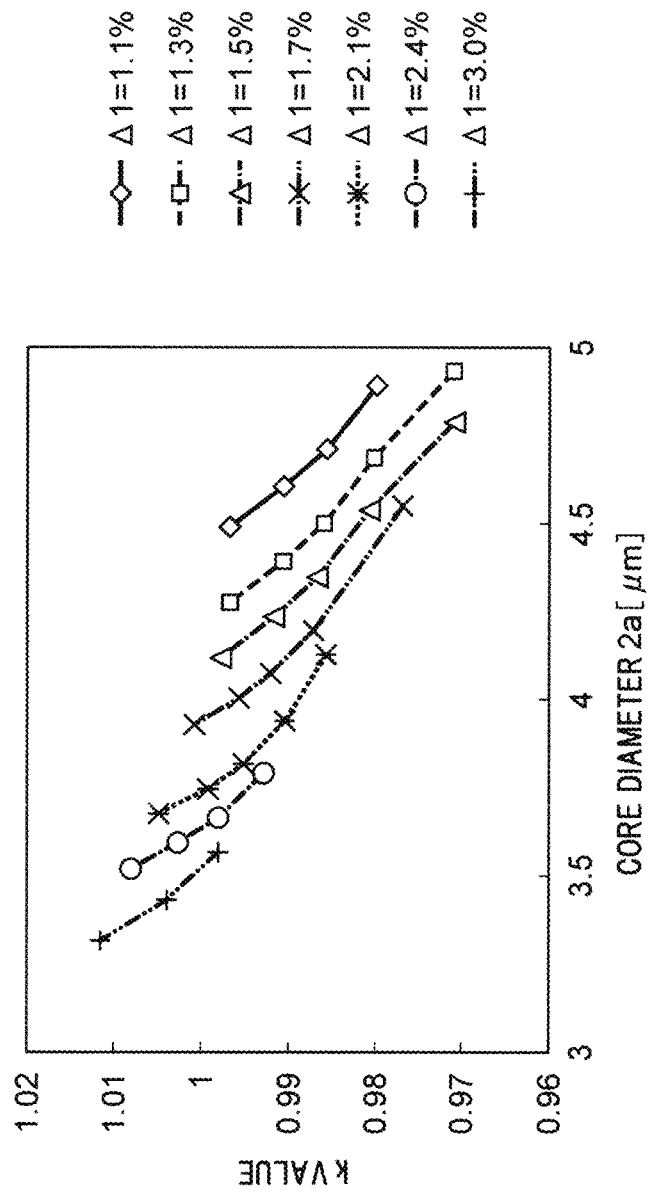

FIG. 10 is a graph illustrating the k value at the wavelength of 1550 nm for each of different values of Δ1 and the core diameter 2a. A smaller k value is preferable because the MFD can be increased without changing Aeff. Furthermore, a smaller Δ1 is preferable because the k value can be made smaller with a greater 2a. To set the k value to 1.01 or smaller, it is preferable that Δ1 be 3.0% or lower and 2a be 3.0 μm or greater. It is more preferable to set the k value to 1.00 or smaller, with Δ1 being 2.4% or lower and 2a being 3.5 μm or greater.

Figure 11:
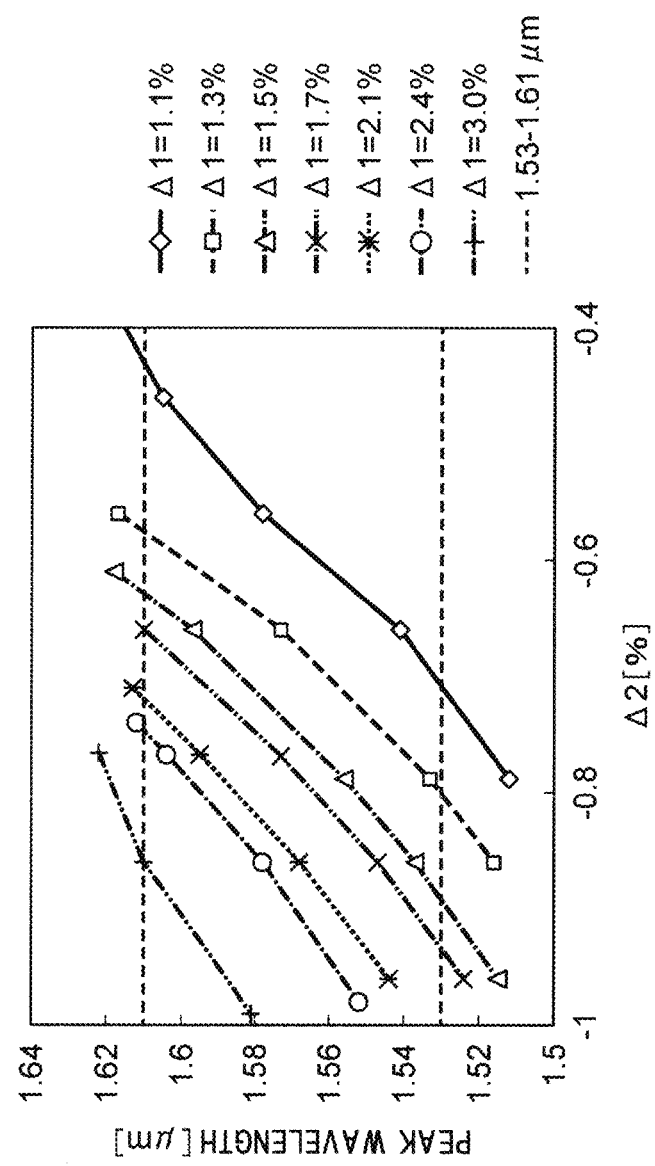
FIG. 11 is a graph illustrating the peak wavelength of the optical fiber illustrated in FIG. 1 for each of different values of Δ1 and Δ2.

FIG. 11 is a graph illustrating the peak wavelength of optical fibers having 2b/2a=2.0 and ρ=0.83 for each of different values of Δ1 and Δ2. In this case, the core radius a is adjusted such that the peak dispersion is −0.5 ps/nm/km. As Δ2 becomes more negative, the peak wavelength can be made shorter. To set the peak wavelength to a value within a range of 1.53 μm to 1.61 μm, it is preferable that Δ2 be within a range of −1.0% to −0.5%.

Figure 12:
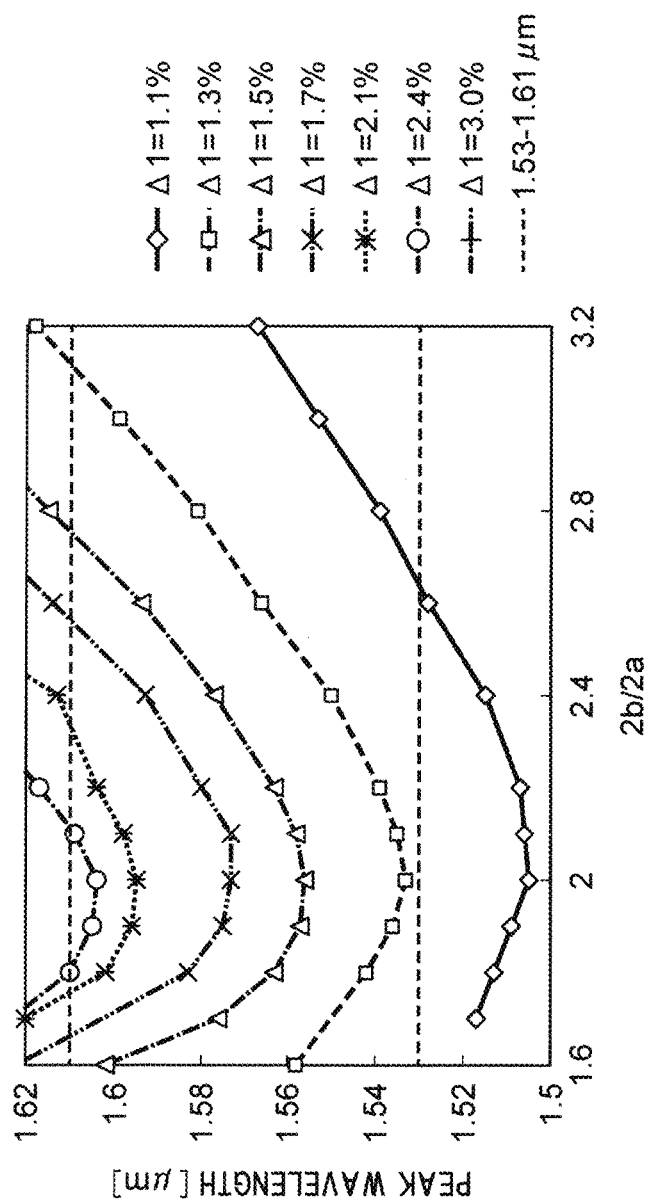

FIG. 12 is a graph illustrating the peak wavelength of optical fibers having Δ2=−0.76% and ρ=0.83 for each of different values of Δ1 and the ratio 2b/2a. In this case, the core radius a is adjusted such that the peak dispersion is −0.5 ps/nm/km. The peak wavelength is shortest at a ratio 2b/2a of around 2.0. If the ratio 2b/2a is smaller than or greater than around 2.0, the peak wavelength becomes longer. To set the peak wavelength to a value within a range of 1.53 μm to 1.61 μm, it is preferable that the ratio 2b/2a be within 1.6 to 3.2.

FIGS. 13 and 14 are tables that summarize relevant specifications of dispersion-flattened HNLFs according to different examples. FIG. 13 summarizes the following specifications of Fibers 1 to 12: the maximum relative refractive-index difference Δ1 of the core 30, the average relative refractive-index difference Δ2 of the depressed portion 40, the outside-diameter ratio 2b/2a between the core 30 and the depressed portion 40, the diameter 2a of the core 30, the core area A, the core-area ratio ρ, the chromatic dispersion (at the wavelength of 1550 nm), and the dispersion slope (at the wavelength of 1550 nm). FIG. 14 summarizes the following specifications of Fibers 1 to 12: the peak wavelength, the peak dispersion, the dispersion curve (at the peak wavelength), the mode-field diameter MFD (at the wavelength of 1550 nm), the effective area Aeff (at the wavelength of 1550 nm), the nonlinear coefficient γ (at the wavelength of 1550 nm), and the k value (at the wavelength of 1550 nm).

Now, an exemplary method of manufacturing the optical fiber 20 will be described. A glass rod for a core having a core-area ratio ρ of 0.7 to 1.0 is manufacturable by a method such as vapor-phase axial deposition (VAD), outside vapor deposition (OVD), or the like. The exponent a of the index profile of the core 30 is preferably greater because the core-area ratio ρ can be made closer to 1.0. For example, α=2.3 substantially corresponds to ρ=0.7, and α=3.0 substantially corresponds to ρ=0.75.

Alternatively, the core-area ratio ρ can be increased to near 1.0 by removing a peripheral portion of a core glass rod having a small core-area ratio ρ. However, if a portion of the core glass rod that is doped with a large amount of Ge is removed inclusively with the peripheral portion, the probability that the core glass rod may become fragile or be foamed tends to increase, in general. To prevent the portion doped with a large amount of Ge from being removed inclusively with the peripheral portion, the core-area ratio ρ is preferably set to 0.7 to 0.9.

The core glass rod obtained as above is wrapped with a glass layer serving as the depressed portion 40, and the resulting body is further wrapped with a glass layer serving as the cladding 50, whereby an optical fiber preform is obtained. By drawing the optical fiber preform, a dispersion-flattened HNLF according to the embodiment is obtained.

Figure 15:
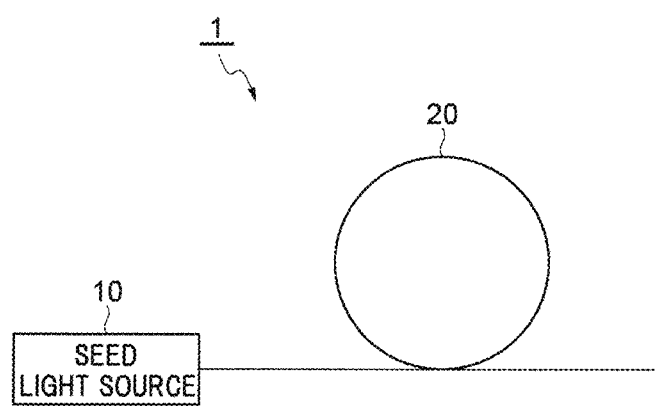
FIG. 15 is a conceptual diagram illustrating a configuration of a light source device according to an embodiment of the present invention.

FIG. 15 is a conceptual diagram illustrating a configuration of a light source device 1 according to an embodiment of the present invention. The light source device 1 includes a seed light source 10 and an optical fiber 20. The seed light source 10 emits light having four or less wavelength components with a center wavelength being within a range of 1530 nm to 1610 nm. The optical fiber 20 is the dispersion-flattened HNLF according to the embodiment. The optical fiber 20 receives, at the input end thereof, the light emitted from the seed light source 10 and allows the light to be guided there inside. While the light is being guided, a nonlinear optical phenomenon occurs. Consequently, light having more wavelength components than the light emitted from the seed light source 10 is generated and is outputted from the output end of the optical fiber 20. The wavelength of the light outputted from the optical fiber 20 preferably falls within a range of 1530 nm to 1610 nm. The wavelength components of the light outputted from the optical fiber 20 are preferably at regular intervals. The output end of the seed light source 10 may be connected to an SSMF, and the SSMF and the optical fiber 20 may be optically connected to each other by a connecting method such as fusion splicing, connection with connectors, or the like.

What is claimed is:

1. An optical fiber made of silica glass, comprising:
a core having a maximum refractive index n1;
a depressed portion surrounding the core and having an average refractive index n2; and
cladding surrounding the depressed portion and having an average refractive index n3,
wherein n1>n3>n2,
wherein the optical fiber has a local maximum value of chromatic dispersion within a wavelength range of 1530 nm to 1610 nm, and the local maximum value is −2 ps/nm/km or greater and below 0 ps/nm/km, and wherein
a dispersion curve at a wavelength at which chromatic dispersion becomes maximal within the wavelength range of 1530 nm to 1610 nm is −0.0003 ps/nm$^3$/km or greater and 0 ps/nm$^3$/km or smaller.

2. The optical fiber according to claim 1,
wherein an effective area at a wavelength of 1550 nm is 18 μm$^2$ or smaller.

3. The optical fiber according to claim 1,
wherein a nonlinear coefficient at the wavelength of 1550 nm is 9/W/km or larger.

4. The optical fiber according to claim 1,
wherein a k value at the wavelength of 1550 nm is 1.01 or smaller.

5. The optical fiber according to claim 1,
wherein a core area A [% μm] is 2.2% ·μm or greater, the core area A being defined as follows:

$$A = \int_0^a \Delta(r) dr, \quad (1)$$

where a denotes a radius [μm] of the core, and Δ(r) denotes a relative refractive-index difference [%] at a radial distance r [μm] from a fiber axis.

6. The optical fiber according to claim 5,
wherein a maximum relative refractive-index difference Δ1 of the core with respect to the cladding is 1.2% or higher and 3.0% or lower, and
wherein a core-area ratio ρ is 0.7 or greater and 1.0 or smaller, the core-area ratio ρ being defined as follows:

$$\rho = A/(\Delta 1 \times a) \quad (2).$$

7. The optical fiber according to claim 1,
wherein a diameter 2a of the core is 3.0 μm or greater and 5.0 μm or shorter.

8. The optical fiber according to claim 1,
wherein a ratio 2b/2a of an outside diameter 2b of the depressed portion to the diameter 2a of the core is 1.6 or greater and 3.2 or smaller, and
wherein an average relative refractive-index difference Δ2 of the depressed portion with respect to the cladding is −1.0% or higher and −0.5% or lower.

9. The optical fiber according to claim 7,
wherein a ratio 2b/2a of an outside diameter 2b of the depressed portion to the diameter 2a of the core is 1.6 or greater and 3.2 or smaller, and
wherein an average relative refractive-index difference Δ2 of the depressed portion with respect to the cladding is −1.0% or higher and −0.5% or lower.

10. A light source device comprising:
a seed light source that emits seed light having four or less wavelength components with a center wavelength being within a range of 1530 nm to 1610 nm; and
the optical fiber according to claim 1 that receives the seed light at an input end of the optical fiber, generates converted light having more wavelength components than the seed light with a nonlinear optical phenomenon that occurs in the optical fiber while the seed light is being guided in the optical fiber, and outputs the converted light from an output end of the optical fiber.

11. The optical fiber according to claim 1,
wherein the dispersion curve at a wavelength at which chromatic dispersion becomes maximal within the wavelength range of 1530 nm to 1610 nm is −0.0002 ps/nm$^3$/km or greater and 0 ps/nm$^3$/km or smaller.

* * * * *